United States Patent
Malackowski (10) Patent No.: US 6,522,101 B2
(45) Date of Patent: *Feb. 18, 2003

(54) RECHARGEABLE BATTERY WITH MEMORY THAT CONTAINS CHARGING SEQUENCE DATA

(75) Inventor: Donald Malackowski, Schoolcraft, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/749,498

(22) Filed: Dec. 22, 2000

(65) Prior Publication Data

US 2001/0020838 A1 Sep. 13, 2001

Related U.S. Application Data

(63) Continuation of application No. 09/458,413, filed on Dec. 10, 1999, now Pat. No. 6,184,655.

(51) Int. Cl.[7] ................................................. H02J 7/00
(52) U.S. Cl. ....................................................... 320/116
(58) Field of Search ................................ 320/116, 132, 320/126; 307/31, 32, 35

(56) References Cited

U.S. PATENT DOCUMENTS

| | | | |
|---|---|---|---|
| 4,288,733 A | 9/1981 | Bilanceri et al. | 320/113 |
| 4,644,245 A | 2/1987 | Brown | 320/127 |
| 4,746,854 A | * 5/1988 | Baker et al. | 320/136 |
| 4,806,840 A | 2/1989 | Alexander et al. | 320/149 |
| 4,878,007 A | 10/1989 | Gábor et al. | 320/136 |
| 4,918,368 A | * 4/1990 | Baker et al. | 320/136 |
| 5,045,769 A | 9/1991 | Everett, Jr. | 320/107 |
| 5,136,231 A | 8/1992 | Faulk | 320/134 |
| 5,182,509 A | 1/1993 | Simmonds | 320/131 |
| 5,187,422 A | 2/1993 | Izenbaard et al. | 320/110 |
| 5,229,705 A | 7/1993 | Kato | 320/148 |
| 5,280,230 A | 1/1994 | Mahoney | 320/132 |
| 5,350,995 A | * 9/1994 | Iketani | 320/155 |
| 5,489,836 A | 2/1996 | Yuen | 320/148 |
| 5,534,765 A | 7/1996 | Kreisinger et al. | 320/106 |
| 5,541,496 A | 7/1996 | Simmonds | 320/151 |
| 5,557,188 A | 9/1996 | Piercey | 320/134 |
| 5,582,928 A | 12/1996 | Farley | 320/150 |
| 5,592,069 A | 1/1997 | Dias et al. | 320/106 |
| 5,872,444 A | * 2/1999 | Nagano et al. | 320/106 |
| 5,956,462 A | 9/1999 | Langford | 392/449 |
| 6,018,227 A | 1/2000 | Kumar et al. | 320/106 |

FOREIGN PATENT DOCUMENTS

| | | |
|---|---|---|
| EP | 0 147 241 | 7/1985 |
| EP | 265879 | * 5/1988 |
| EP | 0 480 648 B1 | 4/1992 |

OTHER PUBLICATIONS

Dallas Semiconductor, S2434—Battery Identification Chip, Preliminary Specification Sheet, Dec. 1995.

* cited by examiner

Primary Examiner—Edward H. Tso
Assistant Examiner—Pia Tibbits
(74) Attorney, Agent, or Firm—Flynn, Thiel, Boutell & Tanis, P.C.

(57) ABSTRACT

A rechargeable battery (22). Internal to the battery is a memory (34) that has data identifying specific charging steps, sequences, that should be executed in order to apply charging current to the battery and to test the charge state of the battery. The battery memory also includes a power required data field that indicates the power required to charge the battery.

20 Claims, 9 Drawing Sheets

RECHARGEABLE BATTERY WITH MEMORY THAT CONTAINS CHARGING SEQUENCE DATA

FIELD OF THE INVENTION

This application is a continuation of application Ser. No. 09/458,413, filed Dec. 10, 1999, now U.S. Pat. No. 6,184,655.

BACKGROUND OF THE INVENTION

A battery charger is a device used to apply power, a charge, to a rechargeable battery. The charge is stored in the battery until it is then drawn on by a complementary power-consuming unit to which the battery is attached. Battery chargers are available for simultaneously charging multiple batteries. Some chargers are capable of simultaneously cycling through different charging sequences to simultaneously charge different types of batteries.

One such battery charger is disclosed in the Applicant's U.S. patent application Ser. No. 09/102,142, filed Jun. 22, 1998, now U.S. Pat. No. 6,018,227, entitled BATTERY CHARGER ESPECIALLY USEFUL WITH STERILIZABLE, RECHARGEABLE BATTERY PACKS, which is incorporated herein by reference. In the system disclosed in this document, each battery or complementary charging module is provided with a memory. This memory stores data that indicates: the currents that should be applied to the battery; the test parameters that indicate whether or not the battery is charged; and the sequence in which the different currents should be applied to the battery and tests performed on the battery to evaluate its charge state. These data are read by a complementary processor internal to the battery charger. Based on these data, the battery charger processor directs the other components internal to the charger to: apply current to the battery and perform specific charge state tests on the battery in a specific sequence; apply the current to the battery at a specific level; and provide an indication of the charge state of the battery. This system is thus able to simultaneously apply charging currents to different batteries in sequences that are appropriate for each battery. This system eliminates the need to provide a charger for each new battery that has a charging sequence or other charging characteristics different from those of the other batteries at the facility at which the batteries are used.

The above-described system is well suited to simultaneously energize a number of different batteries. Nevertheless, there are some limitations to the utility of this system. One limitation is associated with the amount of power that the charger is able to provide to a number of batteries at any given instant. Clearly, the charger's ability to provide power to the batteries is limited by the amount of power outputted by the power supply internal to the charger. For example, one charger is provided with an internal power supply capable of providing 120 Watts of power to the complementary batteries. This particular charger can simultaneously charge four batteries. More particularly, the batteries this charger is intended to charge, at any given instant, will not draw more than 30 Watts. By limiting the number of batteries this charger can charge, it is inherently designed to not be placed in a state in which it is required to provide more power than it can deliver.

However, for reasons of efficiency, other chargers are designed to charge batteries that, collectively, may require more power than can be delivered by the charger power supply. For example it is desirable to provide a charger capable of charging six or more batteries. More particularly, it is anticipated that the normal maximum power required to charge each battery be in the range of 10 to 15 Watts. However, in order to maximize the utility of the charger, it should also be capable of charging batteries that draw as much as 30 Watts. To ensure that the charger be able to simultaneously provide sufficient power to charge all the batteries coupled to it, the charger would require an internal power supply capable of generating 180 Watts. However, the costs associated with providing a power supply capable of this output are noticeably greater than the costs associated with providing a power supply that provides a maximum of 120 Watts. Given the infrequency with which the charger is expected to deliver more than 120 Watts, providing a higher output power supply becomes economically inefficient. Moreover, power supplies capable of generating more than 120 Watts of power are typically appreciable larger in size than their low power alternatives. High output power supplies also generate more waste heat than low power supplies. For the above reasons, it is sometimes desirable to provide a battery charger with an internal power supply that is not able to supply all the power drawn by the batteries that could be connected to it.

Still another inefficiency associated with presently available charges is related to the consideration that, some batteries, after a given number of chargings, need to be completely recharged. This is because of voltage depression. "Voltage depression" is the inherent effect of a NiCd cell which causes a decrease in the cell's capacity to store charge due to the cell not being fully discharged.

In order to facilitate the discharge of batteries, the modules in which they are inserted have been provided with load resistors. Based on the sequence data associated with a battery, the battery is tied across the complementary load resistor. The load resistor serves as a sink for the charge stored in the battery. A disadvantage of this discharge system is that owing to the physical constraints of the size of the module size, the load resistor in the module is also small sized. Due to the small size and power limitation of the load resistor, it can take a lengthy period of time for the battery to fully discharge. Moreover, there may be a situation in which more than one battery needs to be discharged at the same time. In this situation, multiple batteries will discharge their power through the associated module-mounted load resistors. Cumulatively, these resistors will then generate significant amounts of heat. This heat can significantly warm the outer surfaces of the charger and the modules. At a minimum, this heat is simply radiated so as to turn the charger into source of unwanted waste heat. In some circumstances, this heat could warm the charger to a temperature at which a person touching it, or the batteries coupled to the charger, could suffer a burn injury.

SUMMARY OF THE INVENTION

This invention relates to an improved battery charger, a battery that is especially adapted for use with the charger and a method for charging a battery. The battery charger of this invention is able to simultaneously charge a number of different batteries. This battery charger also monitors how much power is drawn by the batteries with which it is used. When a battery is coupled to the charger, based on data read from an associated memory, the charger determines the amount of power needed to charge the battery. If, cumulatively the power required by the new battery and the batteries already being charged is within the charger's availability to provide power, the charging process takes place normally. However, if the cumulative power requirement exceeds the charger's ability to provide power, the charger enters a default charging protocol with regard to the new battery.

The charger of this invention is also provided with a very large capacity load resistor. Switches internal to the charger selectively connect the batteries mounted to the charger to the load resistor. A processor internal to the battery charger controls which of the batteries are connected to the load resistor. At any given time, no more than a maximum number of batteries can be simultaneously tied to the load resistor.

BRIEF DESCRIPTION OF THE DRAWINGS

This invention is pointed out with particularity in the claims. The above and further features and advantages of the invention may be better understood by reference to the following description taken in conjunction with the accompanying drawings, in which:

FIG. 8 is an assembly diagram illustrating how FIGS. 8A and 8B are assembled together to form a flow chart of the process steps executed by the charger of this invention to cycle a battery through the charging process;

DETAILED DESCRIPTION

Figure 1:
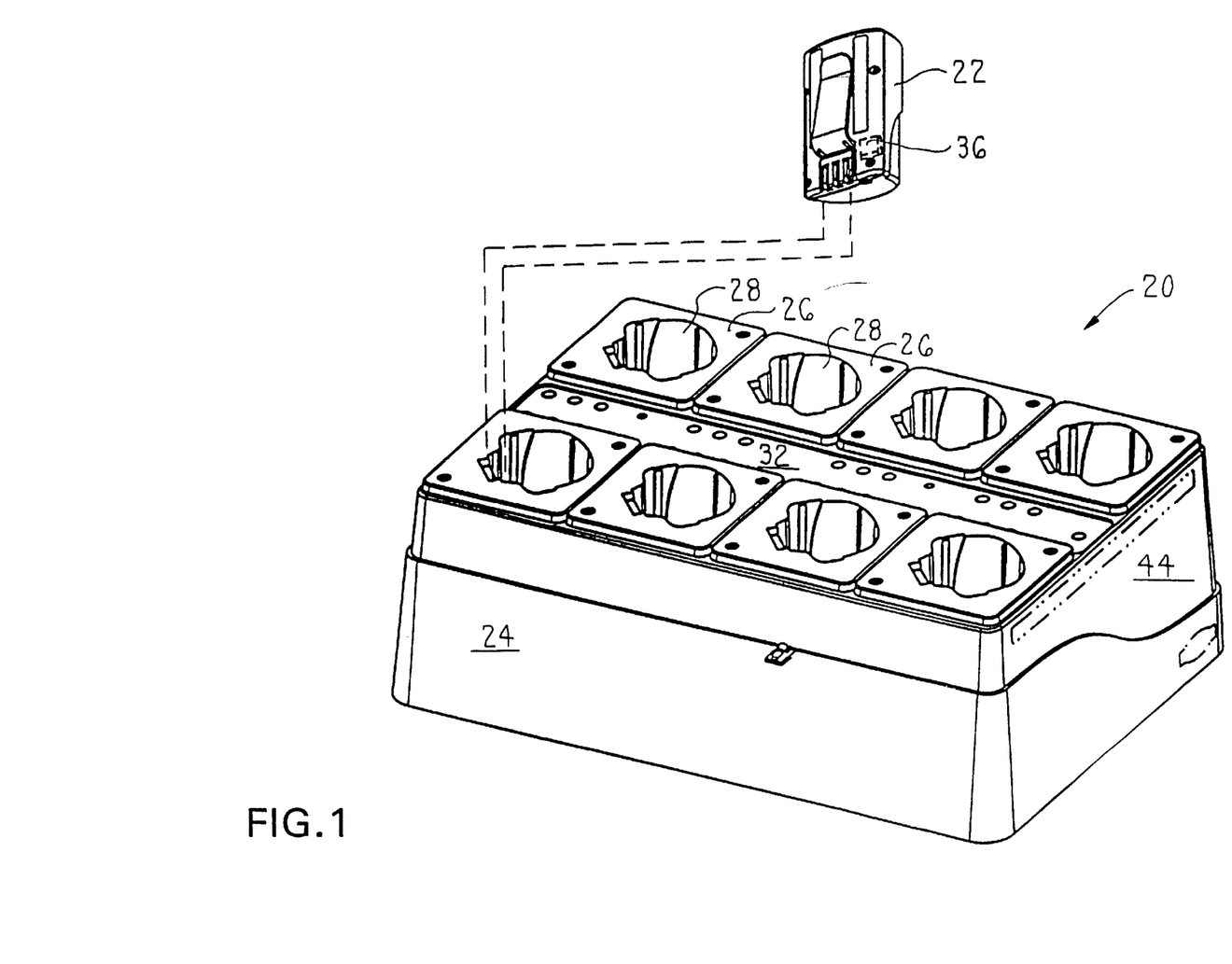
FIG. 1 is a perspective view of a battery charger of this invention and a complementary battery with which the charger is used.
Figure 2:
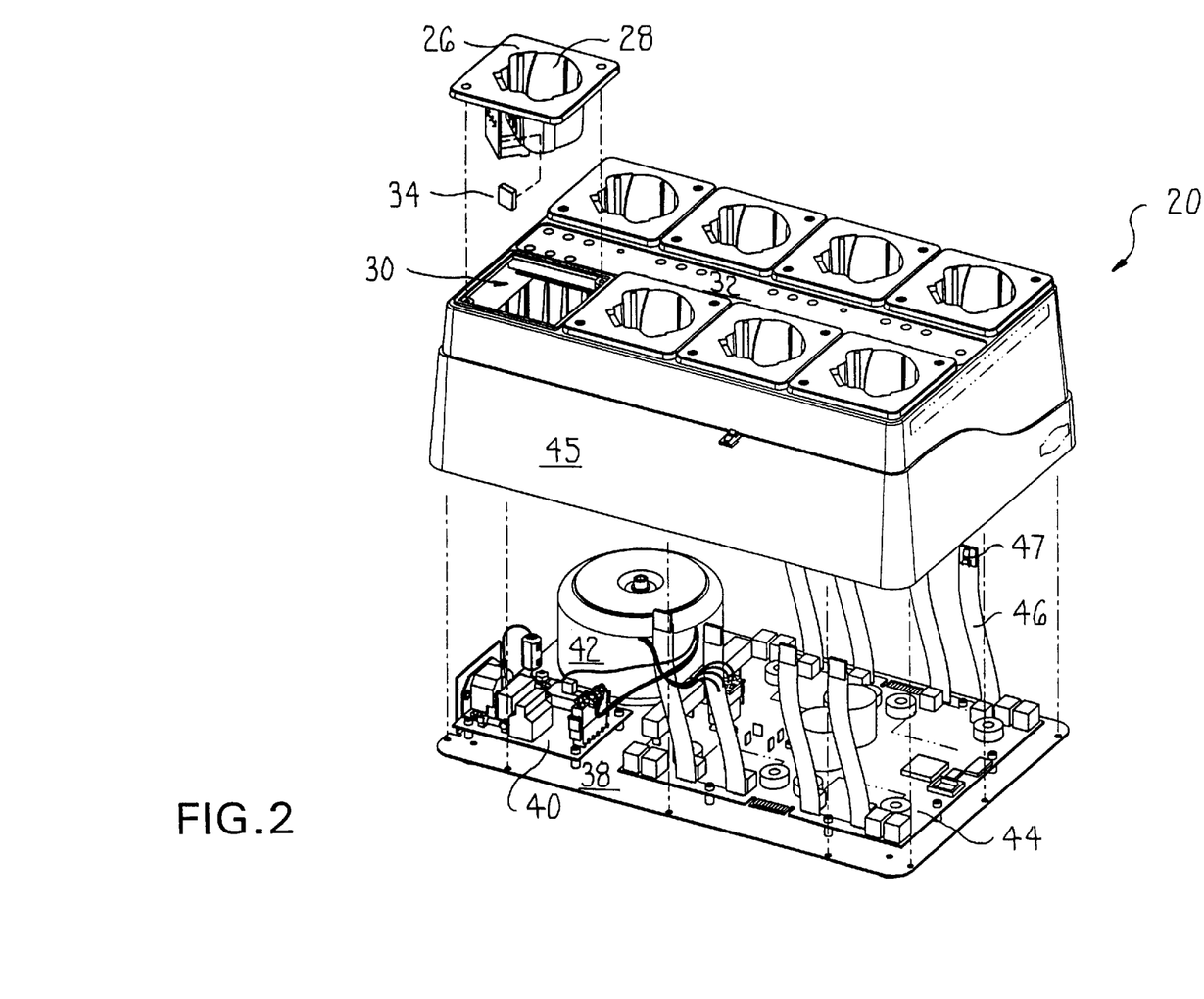
FIG. 2 is a perspective view of the main component boards internal to the charger.

FIGS. 1 and 2 depict a battery charger 20 of this invention and a complementary rechargeable battery 22 especially designed for use with the charger. The battery charger 20 includes a base unit 24 in which the components internal to the charger are housed. Eight modules 26 are removably secured to the top of the base unit 24. Each module 26 is formed with a socket 28 for receiving the head end of a complementary battery 22. The modules 26 are seated in pockets 30 formed in the top of the base unit 24. A display 32 is mounted to the top of the base unit 24 adjacent each module 26. The display 32 provides information about the charge state of the battery 22 in the adjacent module 26. In one version of the invention, display 32 includes a set of three LEDs for each associated module 26.

Figure 4:
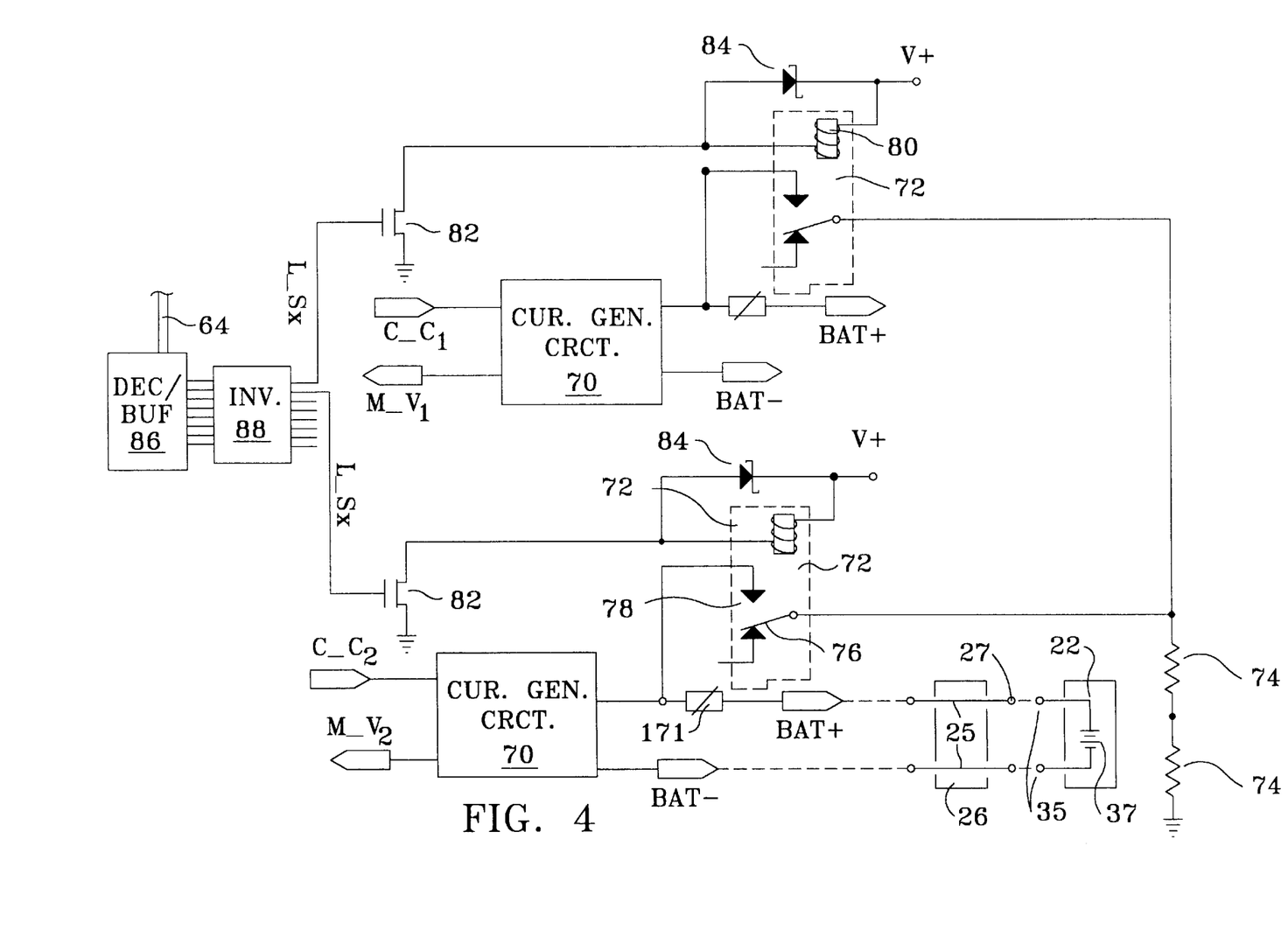
FIG. 4 is a block and schematic diagram of the components internal to one of the charger's current sources and the charger load resistors to which a battery may be selectively connected.

Each module 26 includes a set of conductors 25 that extend from inside the module to exposed contacts 27 located in the shell, (conductors and contacts depicted in FIG. 4). The conductors 25 and contacts 27 provide a conductive path through which current is flowed from the charger 20 to the battery 22. Each module 26 also contains a memory 34. This memory 34 contains data describing the protocol for charging the batteries 22 with which the module is employed. This data identifies the charge states through which the associated batteries 22 are cycled in order to be charged. For each battery charge state, the memory 34 data indicates a specific set of instruction sequences that should be executed in order to apply charging current to the associated battery and to test the charge condition of the battery. The module memory 34 also contains data indicating, for each charge state, the current that should be applied to the battery and the exit test results that indicate whether or not the battery should be cycled from its current charge state to a specific next charge state. Module memory 34 also contains other data described hereinafter.

Each battery 22 includes a set of contacts 35 (FIG. 4). The battery contacts 35 engage the complementary contacts 27 located in the module socket 28. The charging current that is flowed from the charger 20 through the module 26 is applied to the battery through contacts 35. This current charges cells 37, typically NiCd cells, located within the battery 22. The batteries 22 charger 20 is employed to charge may each also include their own memories 36, (shown in phantom in FIG. 1). If a battery is provided with a memory 36, it is typically provided with a dedicated contact 35 over which data are read from and written to the memory 36. The battery memory 36 includes data indicating the number of times the battery has been charged. Battery memory 36 further contains and indication of the energy stored in the battery 22 after it has been charged. Also, some versions of battery memory 36 contain charging instruction data similar to that contained in the module memory 34.

Since battery memory 36 stores data that is acquired during the charging of the battery 22, it should be understood that this memory is a read/write memory. In contrast, data are not written to the memory 34 integral with a module 26.

The battery charger 20 includes a tray 38 which forms the bottom plate of the charger. A first circuit board that is mounted to tray 38 is the power entry circuit board 40. The power entry circuit board 40 is the substrate to which the components are mounted that receive the incoming power signal from the line power supply. These components include the socket to which the line cord is connected, fuses, line voltage filter capacitors and voltage level set switches. A detailed discussion of the arrangement of these components is presented in U.S. patent application Ser. No. 09/102,142, now U.S. Pat. No. 6,018,227, which is incorporated herein by reference.

A power transformer 42 is also mounted to tray 34. Transformer 42 is a step down transformer that converts the line voltage into a low voltage signal suitable for charging the batteries 22. Transformer 42 is a line-type power transformer. The output signals produced by the transform are applied to low voltage regulators (not illustrated). Collectively, the components on the power entry board 40 and transformer 42 are configured to deliver a maximum of 120 Watts of power to the downline components of the charger 20 and the batteries 22 with which it is used.

Tray 38 also supports a primary circuit board 44. The primary circuit board 44 includes the components of the charger that apply charging current to the batteries and that regulate the charging of the batteries. The components integral with the primary circuit board 44 further includes the components that evaluate the charge state of the batteries 22 and that regulate the actuation of displays 32. The voltage regulators that supply constant voltage signals to the down line components of the charger 20 are also located on the primary circuit board 44.

The tray 38, circuit boards 40 and 44 and transformer 42 are covered by a housing 45. The pockets 30 in which the modules 26 are seated are formed in the top of the housing 45. Display 32 is built into the top of housing 45.

Figure 3:
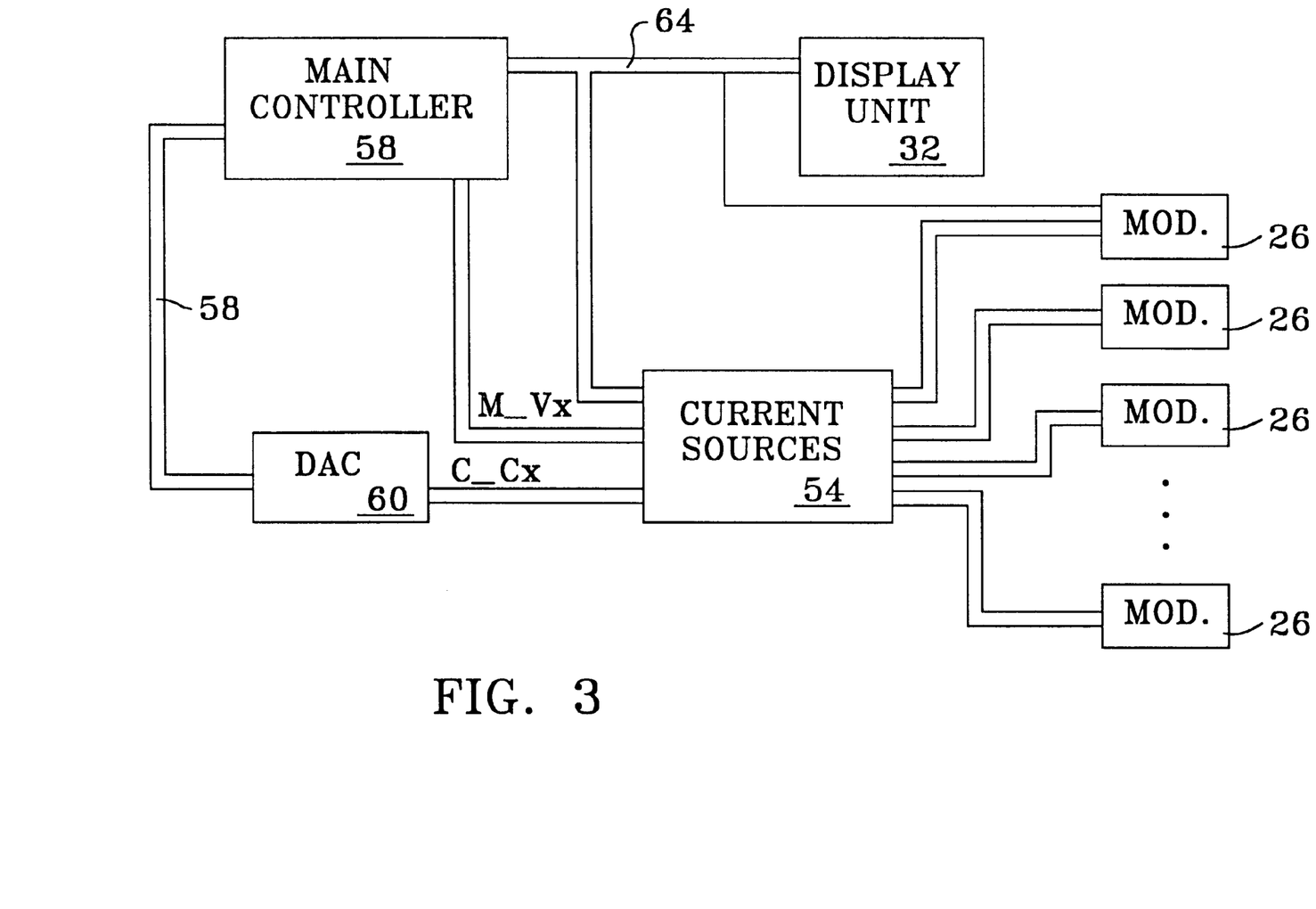
FIG. 3 is a block diagram of the main electric sub-assemblies internal to the charger.

FIG. 3 is a general block diagram of the subsystems of the battery charger 20 mounted on the primary circuit board 44. The battery charger 20 includes eight individual current sources 54. Each current source 54 is associated with a separate one of the pockets 30. When a module 26 is fitted in a pocket 30, an electrical connection is established between the associated current source 54 over a flat line wire bus 46 and a terminal connector 47 (FIG. 2). When a battery is seated in the module socket 28, the current source 54 applies a charging current to the battery through the module 26. (In order to reduce the complexity of FIG. 3, only four modules are depicted.)

The current sources 54 are regulated by a main controller 56 also located on the primary circuit board 44. The main controller 56 includes a microprocessor and ROM and RAM memories, (processor not illustrated; data fields of the memories illustrated in subsequent drawings). The microprocessor controls the actual operation of the current sources. In one preferred version of the invention, a 80C552 processor manufactured by Philips Semiconductor is employed as the microprocessor. The ROM and RAM memories store both the permanent operating instructions and the temporary data and instructions upon which the operation of the current sources 54 are based. The main controller 56 generates digital CURRENT_CONTROLx (C_Cx) signals, to regulate the current produced by each current source 54. The CURRENT_CONTROLx signals are generated in serial form and are output over a bus 58. A digital-to-analog converter/buffer 60 converts each CURRENT_CONTROLx signal into its analog equivalent. Each analog-state CURRENT_CONTROLx signal is forwarded from convertor/buffer 60 to the appropriate destination current source 54.

Each current source 54, in addition to supplying current to the associated battery 22, measures the voltage across the battery. An analog MEASURED_VOLTAGEx signal representative of the measured voltage across the battery is generated by the current source 54 and applied to the main controller 56 over a bus 62. Main controller 56 uses the battery voltage as represented by the MEASURED_VOLTAGEx (M_Vx) signal as an input variable for regulating the generation of the associated CURRENT_CONTROLx signal.

As discussed below, the main controller 56 also functions as a power manager. In performing this function, the main controller 56 regulates the generation of charging current by the current sources 54 to prevent the current sources from collectively drawing more power than the transformer 42 and other power supply components can provide.

The main controller 56 is also connected to the modules 26 over a data bus 64. The connection is provided so that main controller 56 can read the data in the modules memories 34. If a battery 22 used with the charger 20 includes a memory 36, data are written to and read from the memory 36 over bus 64 and through the conductors 25 internal to the module 26. In one preferred version of the invention, data bus 64 includes a number of serial data lines over which data are exchanged with main controller 54. Individual branch lines from data bus 64 extend between the main body of the bus and each module 26. To reduce the complexity of FIG. 3, only a single branch line connection from bus 64 to one of the modules 26 is shown.

Bus 64 also connects main controller 56 to the charger display 32. The main controller 56 forwards the control signals used to regulate the presentation of information by the display 32 to the display over bus 64.

FIG. 4 illustrates in greater detail two current sources 54 of charger 20 of this invention. Each current source 54 includes a sub-assembly referred to as a current generating circuit 70. Each current generating circuit 70 is capable of generating up to 30 Watts of power. The current generated by the circuit 70 is output through BAT+ and BAT− terminals integral with terminal connector 47. The BAT+ and BAT− terminals are connected through the conductors integral with the module 26 to the contacts 35 integral with the battery 22 through which the charging current is applied to the battery. Current flow from circuit 70 to the BAT+ terminal is through fuse 71. The current output by a current generating circuit 70 is proportional to the magnitude of the associated CURRENT_CONTROLx signal applied to the circuit.

The current generating circuit 70 also includes the components internal to the current source 54 for measuring the voltage across the battery 20. The voltage measured is the voltage present across the BAT+ and BAT− terminals. The current generating circuit 70 outputs the MEASURED_VOLTAGEx signal as a function of this measured voltage.

Each current source 54 also includes a relay 72. The relay 72 selectively ties the signal present at the BAT+ terminal of the current source 54 to a low resistance load resistor 74. In the depicted version of the invention, the load resistor 74 is actually two series-connected 3 ohm resistors. The terminal end of the resistor 74 distal from the current source 54 is tied to ground. Physically, resistors 74 are located on the primary circuit board 44. Resistors 74 are high power dissipating resistors. In one version of the invention, each resistor 74 is capable of dissipating up to 20 Watts of power.

The relay 72 includes a wiper 76 that selectively connects the BAT+ terminal to resistors 74. Relay 72 is configured so that the wiper 76 is normally in an open state relative to a contact 78 to which the BAT+ terminal is connected. Wiper 76 is closed against contact 78 by the application of an energization signal to a solenoid 80 also part of relay 72. The solenoid 80 of each current source relay 72 is energized by the application of a 12 VDC $V^+$ signal.

The application of the $V^+$ signal is controlled by a FET 82. The drain of the FET 82 is tied to the end of the winding of solenoid 80 that is distal from the $V^+$ signal source. A forward biased Schottky diode 84 is tied across the winding of the solenoid 80. The source of FET 82 is tied to ground. A LOAD_SETx (L_Sx) signal specific to that current source is tied to the gate of the FET 82 to regulate the on/off state of the FET. The LOAD_SETx signals are generated by the main controller 56. In the depicted version of the invention, the LOAD_SETx signals are asserted by the main controller 56 over one of the serial data lines of bus 64. A decoder/buffer 86 decodes the serial data received over the bus branch line and converts it into eight intermediate signals. These intermediate signals are each inverted in an invertor 88. The output signals from invertor 84 are the individual LOAD_SETx signals.

Figure 5:
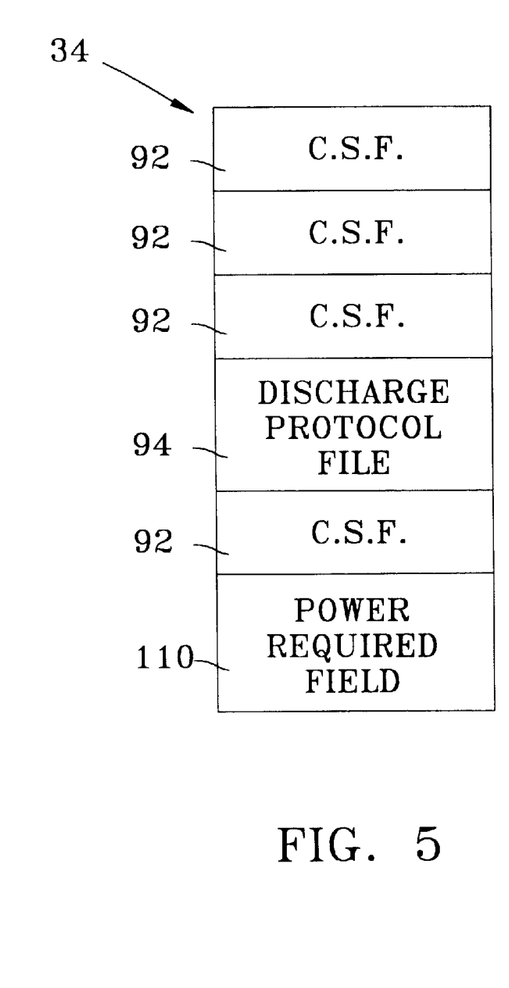
FIG. 5 depicts the data files stored with a module memory.

The contents of the module memory 34, are now described by reference to FIG. 5. The module memory 34 is the primary source of data for information about charging the batteries specifically charged through that module. Memory 34 contains one or more charge state files (C.S.F.) 92. Each charge state file 92 contains data that describes a particular charge state through which the battery 22 inserted into module 26 is cycled in order to charge the battery. Each charge state file 92 includes data indicating a specific instruction sequence that is executed to cycle the battery 22 through the charge state. Each instruction sequence comprises a different set of steps in which current is applied to a battery and exit tests are performed on the battery. The exit tests are performed to determine whether or not the battery should exit the charge state. Each charge state file 92 includes data that indicates the current that should be applied to the battery during the charge state. There is also data in each charge state file 92 that indicates the exit test results that should be meet in order for the battery to exit the charge state. A charge state file 92 also includes data indicating the next charge state to which the battery should be cycled upon the occurrence of specific exit test results.

Typically, during the charging of a battery 22, the battery is cycled through plural charging states. Accordingly, memory 34 typically contains plural charge state files 92. A more complete discussion of the charge state files is found in U.S. patent application Ser. No. 09/102,142, now U.S. Pat. No. 6,018,227, incorporated herein by reference.

Module memory 34 associated with some batteries 22 also includes a discharge protocol file 94. This file 94 is provided in memories 34 that are attached to modules 26 that are used with batteries that are periodically fully discharged to ensure that they are able to consistently be fully charged. The discharging of the battery 22 is considered a selectively executed charging state of the battery. Accordingly, the discharge protocol file 94 is shown as integrated between the two charge state files 92. Typically, the discharging of a battery 22 occurs either close to the beginning or close to the end of the process of charging the battery. In FIG. 5, the discharge protocol file 94 is located immediately before the last charge state file 92.

Figure 6:
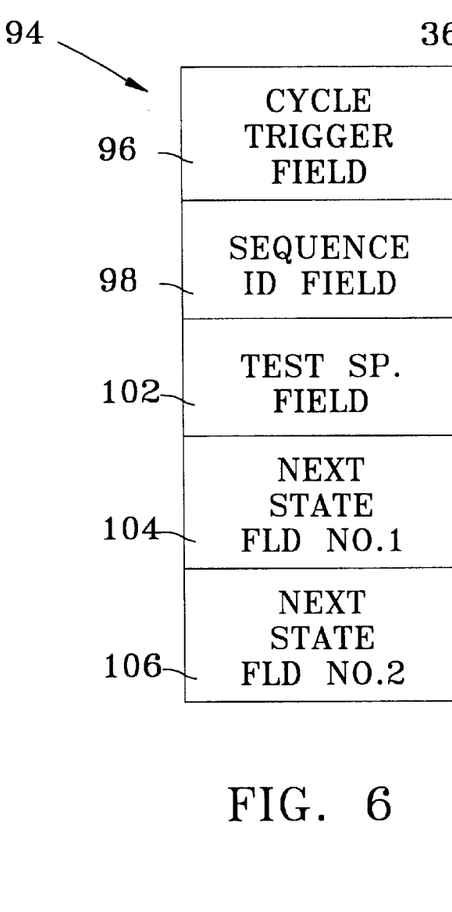
FIG. 6 depicts the data fields within the discharger protocol file of the module memory.

As seen by reference to FIG. 6, the discharge protocol file 94 includes a cycle trigger data 96 field. The cycle trigger data field 96 indicates how many times the battery 22 can be charged before it needs to be fully discharged. A sequence identifier field 98 follows the cycle trigger data field 96. The sequence identifier field 98 identifies the type of test that should be performed on a battery to determine whether or not it is fully charged. Often a battery 22 is simply discharged for a set amount of time. Alternatively, a battery 22 may be discharged until the measured voltage across it falls to a select level or remains at a constant level for a select amount of time. The test or tests identified in the sequence identifier field 98 are those tests necessary to determine whether or not the associated battery can exit the discharge state.

The discharge state file also includes one or more test set point fields 102, (one shown in FIG. 6). Each test set point field 102 contains data indicating the test result set point that should be measured in order to consider the battery fully discharged. If, for example, the battery is discharged for a set period of time, the test set point field 102 contains data indicating for how long the battery should be discharged. Alternatively, if the battery is to be discharged until its measured voltage falls below a set level, the test set point field 102 contains data indicating this voltage level. If multiple exit tests are executed to evaluate whether or not the battery should exit out of the discharge state, the discharge state file 92 will may include plural test set point fields 102.

The discharge state file 92 also includes two next state fields 104 and 106. Discharge state field 104 is a non-discharged state next state field. This field 104 contains data indicating the next charge state to which the battery 22 is cycled if the battery is not cycled through the discharge state. Discharge state field 106 is a discharge state next state field. This field contains data indicating the next charge state to which the battery should be cycled after it is cycled through the discharge state.

Returning to FIG. 5, it can be seen that the module memory 34 also contains a power required field 110. Power required field 110 contains data indicating the maximum power the battery draws during its charging. This maximum power is typically the maximum power applied to the battery 20 in the charge state in which the highest current is applied is applied to the battery. Often, this charge state is the main charge state of the battery 22.

The contents of the battery memory 36 are now described by reference to FIG. 7. Memory 36 includes a total cycle count field 114. Field 114 contains an indication of the total number of times the battery has been cycled through the charging process. There is a cycles since last discharge field 116. Field 116 contains data indicating how many times the battery has been cycled through the charging process since it was last subjected to full discharging. Battery memory 36 also contains a number of voltage history fields 118. The voltage history fields 118 contain data indicating the voltage-at-load of the battery. The data contained in fields 114 and 118 are not relevant to this invention.

Figure 7:
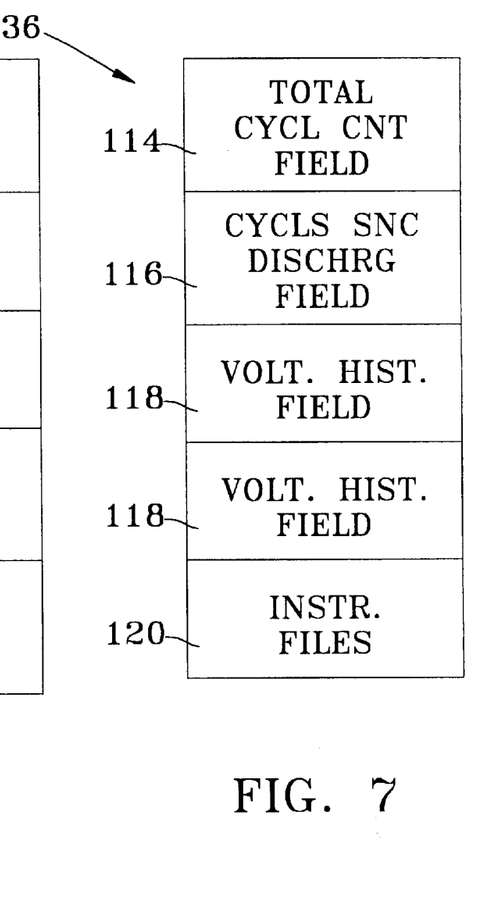
FIG. 7 depicts the data fields within the memory internal to the battery.

The battery memory 36 may contain a set of charge state files, represented as instruction files 120 in FIG. 7. These charge state files are updated versions of the charge state files 92, the discharge state file 94 and power required field 110 described with respect to the module memory 34.

Figure 8:
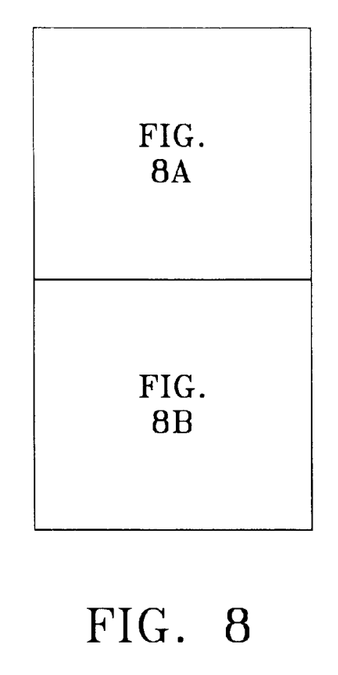
Figure 8A:
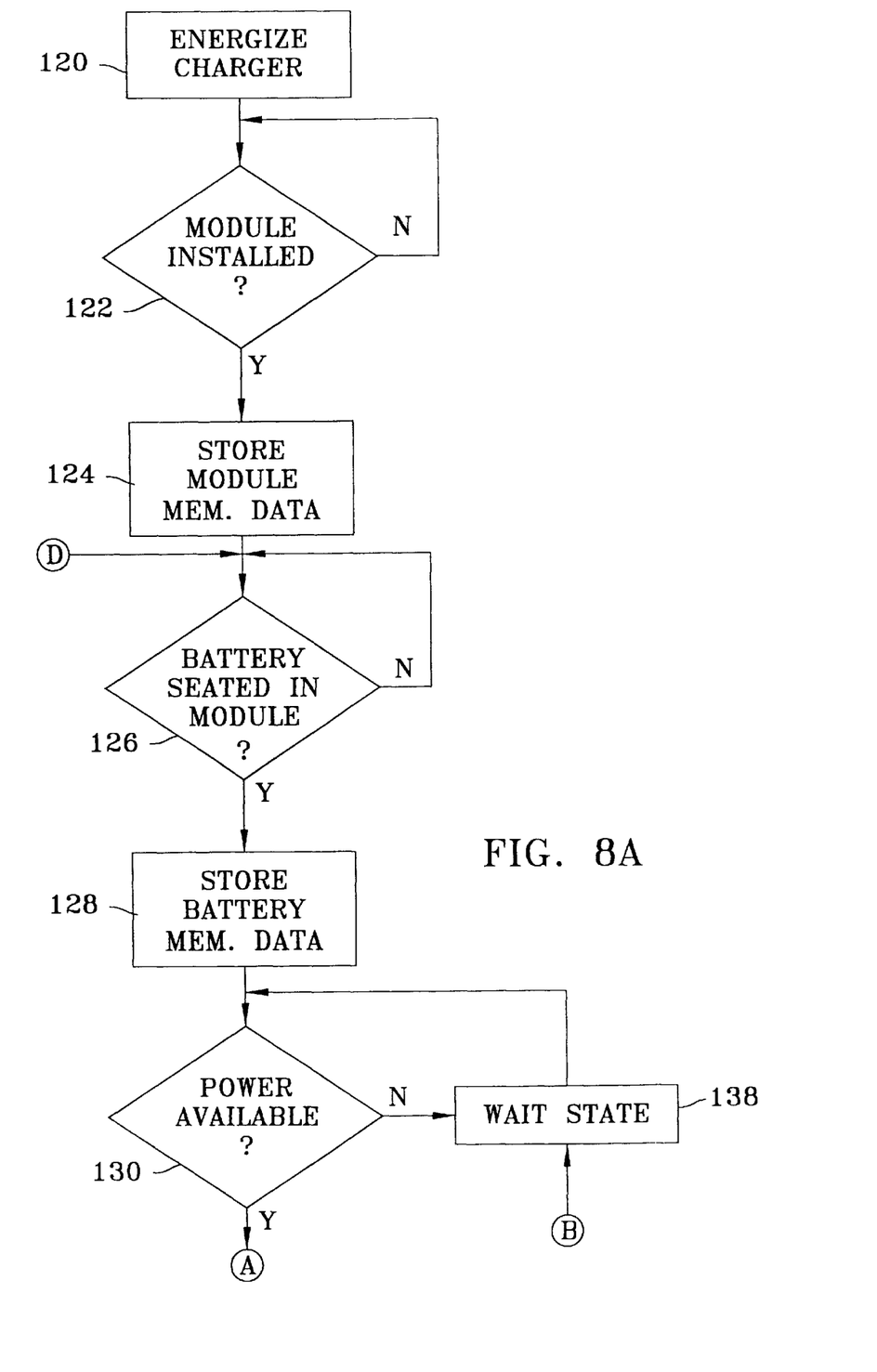
Figure 8B:
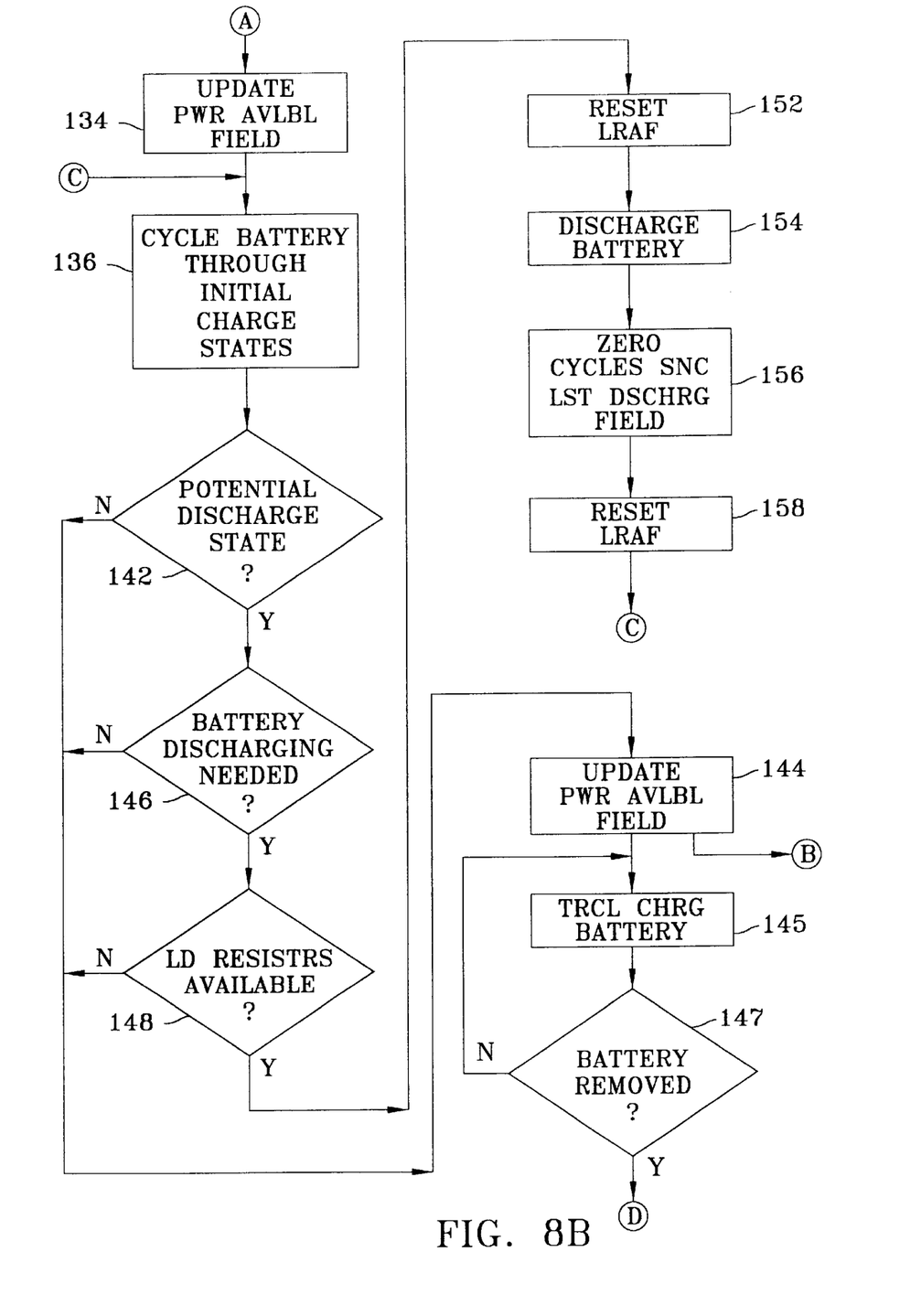

The operation of the charger 20 is now described by reference to the flow chart of FIGS. 8A and 8B. After the charger 20 is energized, step 120, the main controller 56 transmits inquiries over bus 64 to determine if modules 26 are coupled to the charger, step 122. If a module 26 is detected, the data in the module memory 34 is stored in the memory internal to main controller 54, step 124. (To eliminate redundancy in FIGS. 8A and 8B, these figures illustrate the charging steps performed on a single battery 22 when there is a single module 26. It should be recognized that the described steps are performed plural times for the plural batteries.) This data are then used to control the cycling of a battery 22 seated in the module through the charging process.

Once the data from the module memory 34 are stored, the charger determines whether or not a battery 20 is seated in the module, step 126. This monitoring is typically performed by monitoring the MEASURED_VOLTAGEx signal from the current source 54 to which the module is connected. A drop in the open circuit voltage across the BAT+ and BAT− terminals of the current source 54 is recognized by the main controller as an indication that a battery has been inserted in the module 26.

The main controller 56, in a step 128, then reads the data contained in the battery memory 36. It should be recognized that step 128 is an optional step that is only performed if the battery 22 includes a memory 36. A supplemental data file of the module memory 34 (file not illustrated) may contain a battery memory field with a flag that indicates whether or not a memory 36 is potentially present. In step 128, the data in the battery memory 36 are stored in the memory internal to the main controller 54. If the battery memory 36 includes instruction files 120, the instructions contained in these files are then used to control the subsequent charging of the battery. The instructional commands contained in the module memory 34 are disregarded.

Figure 9:
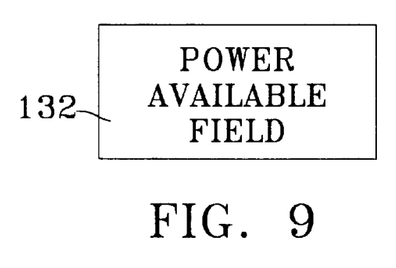
FIG. 9 depicts the power available field which is a data field within the memory of the main controller integral with the charger of this invention.

Main controller 56 then engages in a power available evaluation represented by step 130. In step 130, the main controller 56 determines whether or not the charger 20 at that time has enough power to available to charge the battery 22. This evaluation is made by reference to the data contained in a power available field 132 (FIG. 9) within the memory internal to the main controller. This power available field 132 contains an indication of the amount of power the charger 20 is able to provide the current sources 54 not already supplying power to batteries. Initially, when no batteries are attached to the charger 20, the data in the power available field 132 indicates that the charger has the maximum amount of power available.

It should be recognized that the maximum amount of power that is available to the current sources 54 is less than the maximum power that is output from transformer 42 and the associated components of the power entry circuit board 40. This is because some of the power output from the transformer 42 is always being used to energize the components of the charger 20. Also, once a battery 22 is fully charged, as long it remains seated in a module 26, the battery and the associated current source 54 are in what is referred to as a "trickle state" charging state. In the trickle state, a small amount of current is continually applied to the battery 22 by the current source 54. This continual application of current prevents the battery from loosing its charge. When a battery 22 is in a trickle state, it draws a small amount power. This is a second "sink" of the power that reduces the total amount of power available to fully charge other batteries coupled to the charger 20. Accordingly, if the power transformer 42 is available to supply 120 Watts of power to the charger, the maximum amount of power available for fully charging batteries is approximately 100 Watts.

In step 130, the main controller 130 determines if the charger, as indicated by the data in field 132, has at least as much power available as required by the battery 22. This latter variable is based on the data in the power required field 110 within the module memory 34 of the module 26 in which the battery 22 is seated. battery 22.

If the determination of step 130 is affirmative, the main controller 56 updates the power available field in step 134. This updating occurs by the subtraction from the power available the power that is required to charge this new battery. In other words, the data in the power available field 132 is updated by subtracting the value in the field 132 from the power that is required for the battery as indicated by the data in the power required field 110.

The battery 22 is then cycled through its initial charge states as indicated by step 136. In order to performing this charging, main controller generates the appropriate set of CONTROL_CURRENTx signals to the current source 54 to which the battery 22 is connected. This causes the current source 54 to apply the appropriate sequence of charging currents to the battery 22. As part of step 136, the main controller 56 causes one of the LEDs integral with display 32 to be actuated to indicate the associated battery is being charged. Also, as part of the charging of the battery 22, in step 136, the main controller 56 increments the charge counts maintained in the battery memory 36 field 114 and 116.

If, however, in step 130 it is determined that the charger 20 does not have the power available to charge the battery 20, the charger enters a wait state for that battery. This wait state is represented by step 138. In step 138, the main controller 56 continually reviews the charge states of the other batteries that the charger is charging. If the main controller 56 determines that one of the other the batteries 20 coupled to the charger 20 has cycled through its primary charge states, the main controller reexecutes step 130 for the wait-stated battery. This is because, as discussed below, upon another battery exiting the primary charging states, the data in the power available field 132 is updated to reflect that added power is available to the current sources 54 for charging the batteries 22. This increase in available power may result in a situation in which, in the subsequent execution of step 130, the main controller 56 will determines that power is available to charge the wait-stated battery.

As part of step 138, the main controller 56 also sends command signals to the display for the LEDs associated with the battery 22 in the wait state. Specifically an appropriate LED is caused to be actuated so that the display 32 indicates that the battery is awaiting charging.

As discussed above, when power is available to charge a battery 22, the battery, in step 136, is cycled through the appropriate charge states. In step 136 the battery is cycled through the charge states in which large amounts of current are applied to the battery.

Upon exiting step 136, the main controller 56 determines whether or not the battery is potentially cycled through the discharge state, step 142. The determination is made by a review of the next state data in the charge state file 92 for the charge state from which the battery just exited. If this data leads to a discharge state cycle, more specifically to a discharge protocol file 94, then there is potential that the battery needs to be discharged. If the battery is not potentially cycled through a discharge state, the battery is cycled to its next charging state in which current is applied to the battery. Typically, this state is trickle state described below with respect to step 145.

Prior to the battery entering the trickle state, executing step 145, a power available field update step 144 is executed. In step 144, the main controller 56 revises the data in the power available field 132 to indicate the power that was reserved for the battery just charged is available for use by other batteries. Thus, in step 144 the power available value in field 132 is updated by adding to it the power required power value from the power required field 110 for the battery that just exited the primary charging states. As depicted by the connection between steps 144 and 138, the execution of step 144 for a first battery serves as the trigger in wait step 138 for the main controller to reexecute step 130 for a second battery that is in the wait state.

It should be understood that, implicitly with each discussion below of the battery being cycled into the trickle state, step 145, that prior to that step, the power available field update step 144 is first executed. Accordingly, subsequently executions of power available field update state 144 are not described.

Once the battery 22 enters the trickle state, step 145, a small current is continually applied for the reasons discussed above. The battery 22 is considered full charged and ready for use when it is in this state. Upon placing a battery 22 in the trickle state, the main controller 56 also appropriately actuates the display 32. Specifically, the appropriate LED is actuated to indicate that the battery is fully charged and ready for use.

The battery, and complementary charger 54 remain in the trickle state until the battery is removed from the module 26, step 147. This event is detected by the main controller 56 determining there is a rise in the MEASURED_VOLTAGEx signal back to the open circuit voltage level. Upon this event occurring, the main controller 56 resets the CURRENT_CONTROLx signal for the current source 54 so that only a nominal signal is present across its contacts 27, (step not shown). Then, for the module 26 and current source 54 from which the battery was just disconnected, the charger returns to reexecute step 126, the determining of whether or not a new battery is seated in the module.

If, however, in step 142 it is determined that the battery 22 is one that requires periodic full discharging, the main controller proceeds to a step 146. In step 146, the main controller 56 determines if the battery 22 now needs discharging. This determination is made by comparing the cycle trigger value retrieved from data field 96 for the discharge state file 92 to the cycle count for the battery contained in the cycles since last discharge field 116. If this comparison indicates that the battery has been charged less than the number of times specified by the trigger count, there is no need to now discharge the battery. Accordingly, the main controller cycles the battery to the trickle state, step 145. In other words, the main controller 56 determines whether or not, as part of the charging sequence of the battery, the battery should be cycled through a discharge state.

Figure 10:
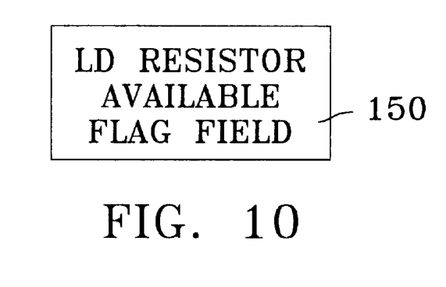
FIG. 10 depicts the load resistor available field which is a data field within the memory of the main controller.

If the comparison of step 146 indicates that the battery has been recharged as many or more times than as specified by the number specified by the cycle trigger value, the battery is in need of fully discharging. The main controller 56 proceeds to a decision step 148. In step 148, the main controller determines if a battery can be tied to the load resistors 74. This determination is made by evaluating the state of load resistor availability flag which is contained within a data field 150, depicted in FIG. 10, which is internal to the memory of the main controller 56.

If the data in the flag field 150 indicates that the load resistors 74 are not now being used, the main controller first resets the flag, in a step 152. This step is executed to prevent other batteries from being tied to the load resistors 74 while one battery is already tied to them. The main controller then proceeds to cycle the battery through the discharge state, step 154.

The exact process by which the battery is discharged and the tests performed to determine whether or not it should exit the discharge cycle are based on the data contained within the discharge state file 92. As part of this process, the main controller selectively asserts the appropriate LOAD_SETx signal to one of the current sources 54. The assertion of this signal closes the associated current source relay 72. The closing of the relay ties the battery across the load resistors 74. The charge stored in the battery 22 is thus drained into and dissipated by the load resistors 74.

Upon exiting the discharge state, the main controller 56 zeros out the count contained in the cycles since last discharge data field 116 integral with the battery memory 36, step 156. The main controller 56 also resets the flag within the load resistor availability flag availability field 150, step 158. The resetting of this flag serves as indication that another battery can now be tied to the load resistors 74. Since the battery is now fully discharged, the charger proceeds to fully recharge the battery. In FIGS. 8A and 8B, this is represented as the reexecution of step 136. Then, upon the reexecution of step 146, the main controller 56 determines that the battery has been charged less times than the number specified by the cycle trigger value. Accordingly, after the second charging of the battery 22, the main controller 56 cycles the battery to the trickle state, step 145.

Returning to the load resistor availability determination step 148, there may be a situation in which another battery 22 coupled to the charger 20 is already tied to the load resistors 74. If the charger 20 is in this state, this condition is indicated by the state of the flag in field 150. If this occurs, the main controller 56 cycles the battery 22 to the trickle state, step 145. This bypassing of the discharge cycle, step 154, occurs because it is not necessary to fully discharge the battery 20. Rather, this discharging is performed only to maintain the utility of the battery. Therefore, instead of placing the battery 22 in some sort of wait state, in which it appears that the battery is not ready for use, the charger simply 20 skips performing the discharging of the battery during this charging sequence. Then, during a subsequent charging of the battery 22, the charger 20 will be a condition in which no other batteries are tied to the load resistors 74. At that time, the charger 20 will execute step 154 to cycle the battery through the discharge state.

The charger 20 of this invention does more than cycle a battery 22 through a charging process that is specifically appropriate for that battery. Prior to initiating the charging process, the charger determines whether or not its power supply has enough power available to charge the battery. Only if this power is available does the charger 20 cycle the battery 22 through the charging process. Accordingly, this charger 20 can be provided with a low-output power supply that is not able to provide the power need to simultaneously charge all the batteries that could potentially coupled to it. An advantage of this arrangement is that this low-output power supplies typically cost less and are small than the high-output power supply that would otherwise be required to meet the charging needs of the multiple batteries. Moreover, in comparison to a high-output power supply, a low output power supply generates less heat and occupies less space.

Still another feature of the charger 20 of this invention is that it is provided with high energy dissipating load resistors 74. These resistors 74 rapidly dissipate the charge stored in any battery 22 to which the resistors are attached. For example with 6 Volt battery that holds 1000 mA hour charge, the resistors 74 of this charger are able to fully discharge the battery in 60 minutes or less. Thus, by providing the charger with resistors 74, the time it takes to cycle a battery through the discharge state, step 154, is minimized. The minimization of the time it takes to execute discharge step 154 reduces the overall time it takes to charge a battery 20 when it needs to be discharged.

Moreover, charger 20 is further designed so that only a single battery 22 is tied to the load resistors 74 at any given moment. This prevents current from one battery being flowed to and possibly charge a second, lower-voltage battery. The unwanted charging of the second battery could possibly over charge the second battery and cause either damage or destruction of its cells.

Still another feature of charger 20 is, if it cannot cycle a battery through the discharge state, execute step 154, the charger places the battery in the trickle state, step 145 is executed. In other words, use of a battery 22 is not prohibited merely because the charger is one or more cycles delayed in when it is able to perform the discharging process. This feature of the invention ensure that at the facility at which the charger is used, fully charged batteries are not needlessly prevented from being used.

Figure 11:
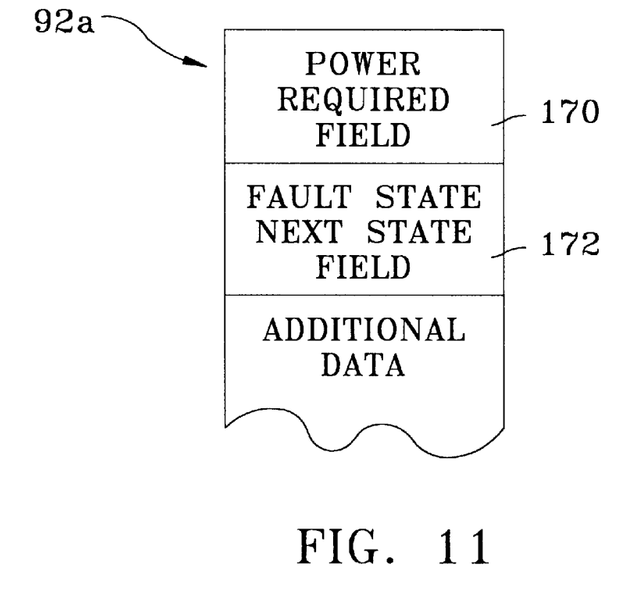
FIG. 11 depicts a portion of a charge state file that may be contained within a memory of an alternative version of this invention.

FIG. 11 is a partial illustration of the contents of a charge state file 92a of an alternative version of this invention.

Charge state file 92*a*, in addition to including the data contained in the first-described charge state file 92 contains additional information. One additional field within charge state file 92*a* is a power allocate field 170. Power allocate field 170 contains data indicating the power that is drawn by the battery 22 associated with the module when it is in the charge state associated with the file. Charge state file 92*a* also includes a fault state next state field 172. Field 172 includes data indicating an alternative charge state through which the battery can be cycled if charger 20 does not have the power available to cycle the battery through the present charge state. If there are no alternative charge states through which the battery can be cycled, field 172 will contain flag data that provides this information.

If the memory 34 or 36 provided is provide with charge state files 92*a*, it typically has plural files 92*a* for one charge state. The main charge state is the state in which the most power is applied to the battery. Thus, it is often the main charge state for which the battery will have two or more charge state files 92*a*. A first one of the files 92*a* contains the data upon which a high powered charging of the battery can proceed. The second file 92*a* contains the data upon which low powered charging of the battery can proceed. One difference between high and low powered battery charging is that in current level of the signal applied to the battery during a low powered charge is less than that is applied to the battery during a high powered charge. Also, the time a battery is allowed to stay in the charge state, an exit test parameter, is greater for a low powered charge as opposed to a high powered charge.

Figure 12:
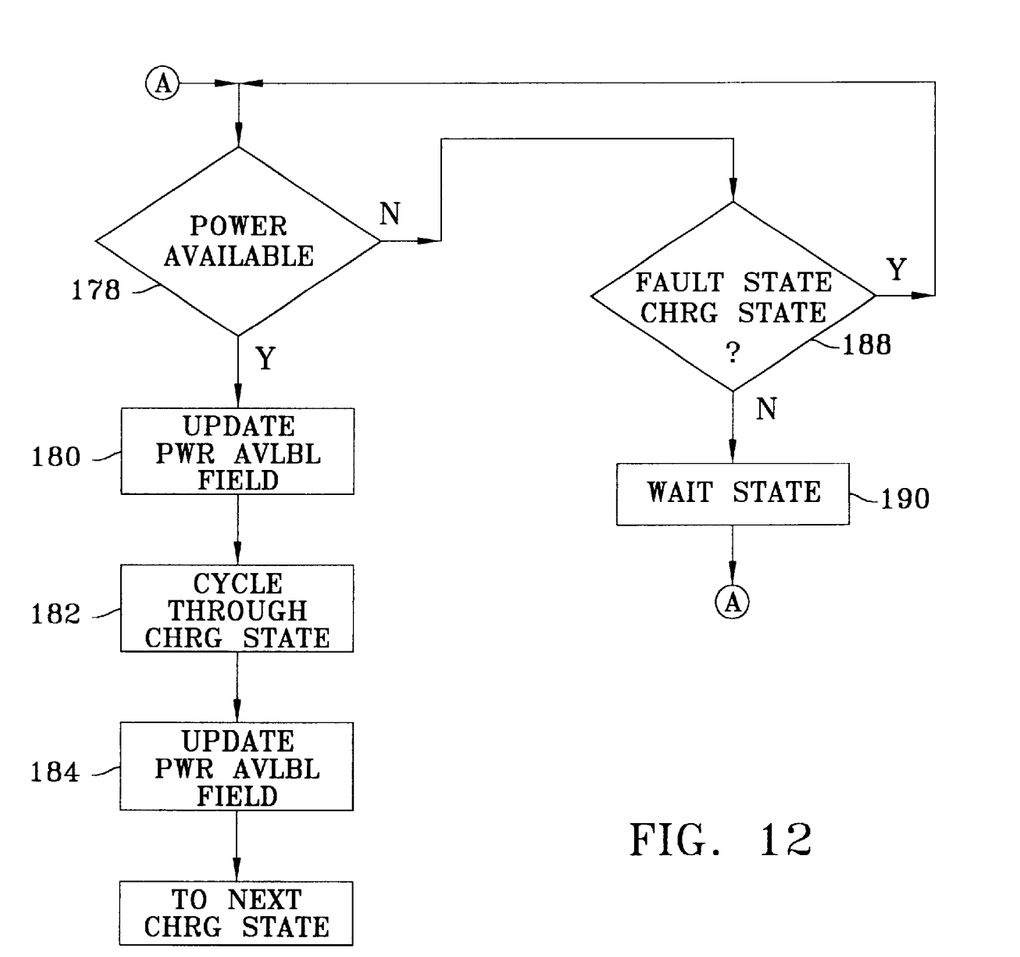
FIG. 12 is a flow chart of the process steps executed by the alternative version of this invention.

FIG. 12 is a flow chart of the process steps executed by a charger 20 of this invention when the memory 34 or 36 associated with the battery includes the above described charge state files 92*a*. The process steps illustrated in FIG. 12 substitute for previously described process steps 130, 134, 136 and 138.

More specifically, in the process of FIG. 12, the charger, upon determining a battery 20 is seated in a module, initiates a charging sequence for that battery. The first step the main controller 56 performs upon entering any charge state for that battery is to execute a power available evaluation, step 178. Step 178 is similar to described step 130. However, in step 178, the main controller based on the data from the power required field 170 and the data from the power available field 132 whether or not the charger has enough power available to execute the cycle through charging state for that battery 22.

If, in step 178, the main controller 56 determines that there is enough power available to cycle through the charge state, the main controller proceeds to an update power available step 180. Step 180 is similar to the previously described step 134. In step 180, the data in the main controller's power available field 132 is adjusted based on the power required data in field 170. The main controller 56 then proceeds to cycle the battery through the next charge state, step 182.

Upon the exiting of the battery from a charge state, the completion of step 182, the charger executes a power available field update step 184. Step 184 is similar to step 144. In step 184, the power available field is updated by adding to the level of available power the power that was previously allocated for the above executed charging state. After step 184 is executed, the charger 20 is ready to cycle the battery through its next charging state. For the next charge state, step 178 is then executed.

However, in step 178, the main controller 56 may determine that the charger 20 does not have enough power available to cycle the battery through the charging state. This is a fault condition. If this determination is made, the main controller, in step 188, determines whether or not there is a fault state charging state for this particular charging state. This determination is made based on the data read from the fault state next state field 172 associated with that charger.

If there is a fault state charge state, the main controller 56 initiates the cycling of the charger through the new charge state. The initiation of this cycle begins with the execution of step 178 for the new charge state. In the determination of this reexecution of step 178, the power available comparison is performed based on the data in the power required field 170 for the fault state charge state. The power required to cycle through this charge state is less than the power required to cycle through the first charge state through which the charging did not have enough power. Accordingly, there is an increased likelihood that the charger will have enough power available to cycle the battery through this second, default level charge state.

However, in step 188 the main controller 56 may determine that there is no fault state charge state for the particular battery state. If this determination is made, the charger enters a wait mode, step 190, for the battery. The wait mode of step 190 is similar to the previously described wait mode step 138. In step 190, the main controller 56 continually evaluates whether or not a power available field update step 184 due to the exiting of a charging state for one of the other batteries connected to the charger.

Furthermore, it should also be recognized that, during the execution of step 178 at the beginning of the cycling through a fault state charge state, it may be determined that the charger does not have enough power available to cycle through the charge state. Then, it may be determined in the second execution of step 188 that there is no second level fault state charge state. If these events occur, the charger 20 of this invention places the battery in the wait state, executes step 190. Then, when step 178 is executed a third time, the power available determination will be based on whether or not the system has the power available to cycle through the initial high power required charging state.

The version of the charger 20 and method of battery charging described with respect to FIGS. 11 and 12 at least initiates the charging process for each battery inserted into the charger. Only if the charger is unable to supply the power needed to cycle a battery through a particular charge state is the charging of that battery interrupted. Thus, this version of the invention does not delay the complete execution of the charging process just because the power demands during one charging state cannot be meet.

Moreover, even if the charger cannot immediately supply all the power required for charge state, the charger 20 does not automatically place the battery in a wait state. Instead, the charger first determines whether or not there is a low powered charge state through which the battery can be cycled and if can supply the power needed to cycle the battery through this alternative state. Only if there is no alternative, low powered charging state or the charger cannot supply the power need to cycle through this state is the battery placed in a wait state. Thus, this version of the invention, even if the charger 20 cannot supply the preferred amount of power required to perform a high-powered charge of battery, it will supply some power. Thus, while charging process may be slowed, it will not be totally suspended.

Collectively, these features of the above version of the invention, in some environments, allow the charger 20 to relatively rapidly charge relatively large numbers of batteries to which large amounts of power are applied.

It should be understood that the foregoing description is for the purposes of illustration only and the invention can be practiced using components and process steps different than what has been described above. For example, some batteries 22 with which the system is used may only require small amounts of power during the charging cycle. For the purposes of this invention, "small amount of power" is understood to usually be under 5 Watts and, more typically, under 3 Watts. When one of these batteries 22 is coupled to the charger 20, the complementary power available field 110 will contain an indication to the charger 20 that power availability determination step 130 not be performed. Charger 20 will then immediately supply the power needed to charge the battery 22. The reason step 130 and the subsequent steps thereafter are not executed is because if the battery requires only requires a small amount of power during charging, the amount employed will not appreciably draw on the charger's overall ability to supply power.

Also, in some versions of the invention, the methods for cycling a battery through a number of different charging states can be interleaved. Thus, if upon the insertion of the battery 22 into the charger 20, it is determined that the charger does not have enough power to commence high powered charging of the battery, the battery can then be cycled through a sequence of charging steps that requires-lesser amounts of power. Alteratively, if there is not enough power facilitate low power charging of the battery, the battery is then cycled through a wait state charging sequence. In this charging sequence, the associated current source 56 is not energized to charge the battery and a step equivalent to step 138 is periodically reexecuted. This step is reexecuted until the charger has power available to perform a charging sequence in which current is applied to the battery.

It should of course be understood that, if the charging state instruction data is stored in the battery memory 36, this data, as opposed to the data in the module memory 34, is used to regulate the charging of the battery. Also, in some versions of the invention, each battery 22 contains data in a memory 36 that carries charging instructions are located in the batteries themselves. In these versions of the invention, the modules 26 are not provided with memories.

Also, in some versions of the invention, the charger may be responsive to commands that are entered through control switches mounted to housing 45. For example, the display 32 can include a touch screen display or an LCD that provides in indication that the charging of a particular battery is being waited stated or slowed do to the lack of power. Then, by pressing an appropriate command button, the user indicates that the particular battery should receive priority charging. In response to receiving the resultant command signal, the main controller 56 first causes another battery to early exit its charging sequence. Then, with the power available for the new battery, the charger goes on to apply a charging current to the priority battery. This construction may be useful in a medical facility wherein the charging of some batteries may take priority over the charging of other batteries.

Alternatively, in other versions of the invention, the memory 34 or 36 associated with a battery may have data indicating the relative priority with which the battery should be charged. If a battery having a certain priority is placed in the charger 20, the main controller 56 will automatically terminate the charging of battery having a lesser priority. The charger 20 then applies a charging current to the newly inserted battery, the battery with the higher charging priority.

Moreover, in the described version of the invention, the charger 20 is configured so that only a single battery is connected to the load resistors 74 at any given moment. In other versions of the invention, it may be possible to connect plural batteries 22 to the load resistors 74. In these versions of the invention, it is necessary to provide the charger 20 with diodes or other voltage control components to prevent a first battery connected to the resistor 74 from flowing current to a second battery also connected to the resistor. In these versions of the invention, the memory integral the main controller 56 has a data field in which a count of the number of batteries connected to the load resistors 74 is maintained. Whenever a maximum number of batteries 22 are so connected, the main controller 56 will not cycle other batteries through their discharge states.

Also, it should be recognized that, in some versions of the invention, the battery memories 36 may be provided with cycle count do not exceed fields. This fields contains data indicating the maximum number of times the associated battery can be charged before it must be discharged. In chargers 20 used to charge a battery 22 having this data, the main controller 56 references the data to determine if the battery is due for a mandatory discharge. If the battery is in this state, and the data in the load resistor flag field 150 indicate that the load resistors are unavailable, the main controller 56 places the battery in a wait state. Then, upon receiving an indication that the load resistors 74 are available, the main controller 56 starts to cycle the battery through the discharge sequence.

Also, in some versions of the invention, the modules 26 are provided with their own load resistors. A battery inserted in one of these modules is selectively tied across the module load resistor if, as part of the charging process, it is desirable to at least partially discharge the battery. An advantage of providing this set of load resistors is that they can ensure that the charging of the batteries will proceed even if the primary load resistors 74 are attached to another battery.

Moreover, it should be realized that the process steps and the sequence in which the process steps of this invention are executed may be different from what has been described. For example, in some versions of the invention, batteries that need to be periodically discharged may be cycled through the discharge state before they are cycled through any charging states in which current is applied to the battery. In these versions of the invention, a step equivalent to step 142 is executed before a step equivalent to step 136 is executed. An advantage of this construction of the invention is that the complete discharging of a battery will not be delayed due to the inability of the charger 20 to supply the current needed for the subsequent recharging of the battery.

It should likewise be realized that, in other versions of the invention the modules 28, as well as their complementary memories 34, may be fixed to the charger 20. While this version of the invention may not have the intechangability of the above preferred described versions, it may be more economical to provide. In these versions of the invention, the individual modules may not even have memories associated therewith. Instead, the memory integral with the main controller 56 stores power required data for the batteries charged by the charger 20. In this version of the invention, the batteries may have some type of identify component, such as memory data or a resistor that has a specific resistance, that identifies its type. After determining the type of battery attached to it, the main controller 20 performs step 130 based on the power required data it has specific for that type of battery.

Similarly, in other versions of the invention, FETs or other non-moving switches may be used to control the connection of the batteries 22 to the load resistors 74.

Also, in the above-described version of the invention, the power employed to facilitate the trickle state charging of a battery is not considered power drawn from the power that the power supply has available to perform battery charging. This may not always be the case. In some versions of the invention, the power required for trickle state charging may be considered power drawn from the power that would otherwise be available for other cycling other batteries through other charge states. Accordingly, in other versions of the invention, the power available field update step 144 is not performed until, from step 147, it has been determined that the charged battery has been removed and the application of trickle voltage has ceased.

Moreover, other versions of the system can be configured so that the post trickle state charging power available updating only occurs for batteries that draw a relatively large current during trickle state charger. Also, in some versions of the invention, immediately prior to the commencement of trickle state charging, there is a first power available field update step. In this step, substantially all the power that was reserved by the battery for its charging is added back into the power available field. Then, upon the removal of the battery, the completion of trickle state charging, a second power available field update step is executed. In this step, the remaining power reserved to the battery is added back into the pool of power available to charger other batteries. Therefore, it is the object of the appended claims to cover all such modifications as come within the true spirit and scope of this invention.

What is claimed is:

1. A rechargeable battery pack comprising:
   a housing;
   at least one rechargeable cell disposed in said housing;
   a first set of terminals attached to said housing that are connected to said at least one rechargeable cell, wherein a charging current is applied to said at least one rechargeable cell through said first of terminals and current is drawn from said at least one rechargeable cell through said first set of terminals;
   a memory disposed in said housing, said memory having a power required data field containing data indicating the power required by said at least one rechargeable cell to charge said rechargeable cell and data indicating a sequence in which the charging current is applied to said at least one rechargeable cell based on the power available to charge said cell; and
   a second set of terminals attached to said housing and connected to said memory, wherein the data in said memory are read from said memory over said second set of terminals.

2. The rechargeable battery of claim 1, wherein said memory further includes data indicating the number of times the charging current has been applied to said at least one rechargeable cell.

3. The rechargeable battery of claim 1, wherein said memory further includes data upon which a processor external to said battery can determine whether or not, as part of a process of charging said at least one rechargeable cell, it is necessary to discharge said cell.

4. The rechargable battery of claim 1, wherein said first set of terminals and said second set of terminals includes at least one common terminal.

5. A rechargeable battery, said battery having:
   a housing;
   at least one rechargeable cell disposed in said housing;
   a memory disposed in said housing, said memory including data for establishing a charging sequence for applying a charging current to said at least one rechargeable cell, the charging sequence data including data indicating the power required to charge said cell, the charging sequence data indicating the sequence in which charging current is applied to said at least one rechargeable cell based on the power available to charge said at least one rechargeable cell; and
   a plurality of terminals attached to said housing wherein said terminals are connected to said rechargeable cell so that the charging current can be applied to said cell and current can be drawn from said cell and said terminals are connected to said memory so that the charging sequence data in said memory can be read from said memory.

6. The rechargeable battery of claim 5, wherein said memory further includes data indicating the number of times the charging current has been applied to said at least one rechargeable cell.

7. The rechargeable battery of claim 5, wherein said charging sequence data in said memory indicates whether or not, as part of a process of charging said at least one rechargeable cell, it is necessary to discharge said cell.

8. The rechargeable battery of claim 5 wherein, said plurality of terminals includes at least one first terminal that is connected to said at least one rechargeable cell and at least one second terminal that is separate from said at least one first terminal that is connected to said memory.

9. A rechargeable battery, said battery having:
   a housing;
   at least one rechargeable cell disposed in said housing;
   a memory disposed in said housing, said memory including data for establishing a charging sequence for applying a charging current to said at least one rechargeable cell, the charging sequence data including:
      a first data field that contains data indicating if, as part of the charging of said at least one rechargeable cell, said rechargeable cell is subjected to a periodic discharging;
      a second data field that contains data indicating after how many chargings of said at least one rechargeable cell said rechargeable cell should be subjected to discharging;
      a third data field that contains data indicating, after how many chargings of said at least one rechargeable cell, said rechargeable cell must be subjected to a mandatory discharging;
      a fourth data field that contains data indicating the number of times said at least one rechargeable cell has been charged after a last discharging of said rechargeable cell; and
      a plurality of terminals attached to said housing wherein said terminals are connected to said rechargeable cell so that a charging current can be applied to said cell and current can be drawn from said cell and said terminals are connected to said memory so that the charging sequence data in said memory can be read from said memory and data indicating the number of times said rechargeable cell has been charged can be written to said fourth data field.

10. The rechargeable battery pack of claim 9, wherein said memory further includes charging sequence data that indicate specific charging steps through which said at least one rechargeable cell is cycled in order to charge said cell.

11. The rechargeable battery pack of claim 9, wherein said m emory further includes charging sequence data that indicate specific charging steps through which said at least one rechargeable cell is cycled in order to charge said cell based on the power available to charge said cell.

12. The rechargeable battery pack of claim 9, wherein said plurality of terminals includes at least one first terminal that is connected to said at least one rechargeable cell and at least one second terminal that is separate from said at least one first terminal that is connected to said memory.

13. A rechargeable battery pack, said battery pack including:
   a housing;
   a plurality of terminals mounted to said housing;
   at least one rechargeable cell disposed in said housing and connected to at least one said terminal; and
   a memory disposed in said housing, said memory connected to said terminals and containing data for determining a sequence for applying a charging current to said at least one cell, the charging sequence data including:
      a first data field in which data are stored that indicates the number of times the charging current has been applied to said cell after the discharging of said cell;
      a second data field in which data are stored that indicates, after how many chargings of said cell, said cell should be subjected to an optional discharging prior to said charging of said cell; and
      a third data field in which data are stored that indicates, after how many chargings of said cell, said cell must be subjected to a mandatory discharging prior to said charging of said cell.

14. The rechargeable battery pack of claim 13, wherein said memory further includes charging sequence data that indicate specific charging steps through which said at least one rechargeable cell is cycled in order to charge said cell.

15. The rechargeable battery pack of claim 13, wherein said plurality of terminals includes at least one first terminal that is connected to said at least one rechargeable cell and at least one second terminal that is separate from said at least one first terminal that is connected to said battery.

16. The rechargeable battery pack of claim 13, wherein said memory further includes charging sequence data that indicate specific charging steps through which said at least one rechargeable cell is cycled in order to charge said cell based on the power available to charge said cell.

17. A method of charging a battery, said method including the steps of:

reading charging sequence control data from a memory internal to the battery, the charging sequence control data including discharge cycle decision data;
   applying a charging current to the battery;
   performing a discharge cycle evaluation on the battery to obtain battery discharge data;
   comparing the battery discharge data to the discharge cycle decision data; and
   based on said comparison, selectively connecting the battery to a load so as to discharge the battery and, after said discharging of said battery, applying a charging current to the battery.

18. The method of charging a battery of claim 17, wherein:
   the discharge cycle decision data is data indicating the number of times the battery can be charged prior to a discharging;
   said discharge cycle evaluation step comprises determining the number of times the battery has been charged after the last said discharging of said battery so as to generate battery discharge data that indicates the number of times the battery has been charged after the last said discharging of said battery;
   in said comparison step, the number of times the battery has been charged after said last discharging step is compared to the number of times the battery can be charged prior to a discharging; and
   if said comparison step indicates that the battery, since the last said discharging has been charged more times than the number of times the battery can be discharged after a discharging, said discharging step is executed.

19. The method of charging a battery of claim 18, further including the step of, after said charging of the battery, writing into the battery memory data indicating the number of times the battery has been charged.

20. The method of charging a battery of claim 17, wherein said step of applying a charging current to the battery is performed prior to said steps of performing said discharge cycle evaluation, said comparison of the results of said discharge cycle evaluation and said selective discharging the battery based on said comparison.

* * * * *